Dec. 29, 1925.                             1,567,419
M. CARRASCO-SÁNCHEZ
MECHANICAL MOVEMENT
Filed April 3, 1925        3 Sheets-Sheet 1
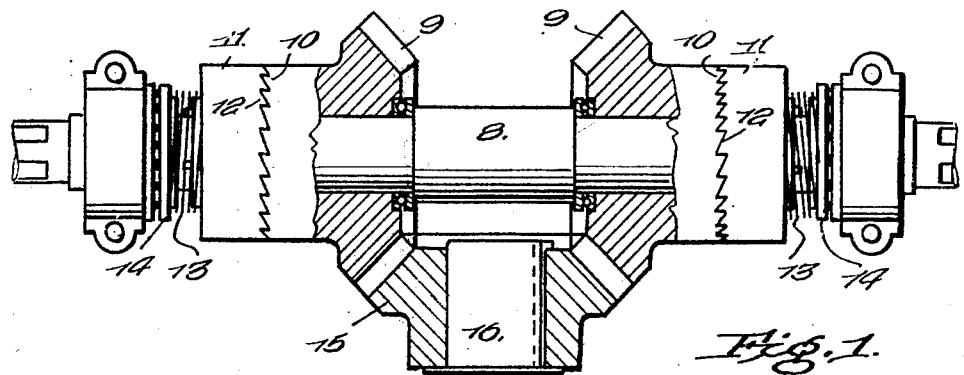
Fig.1.
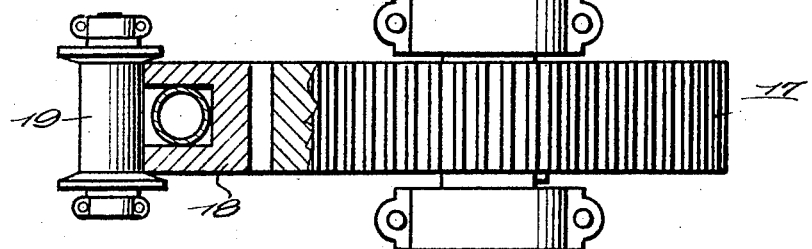
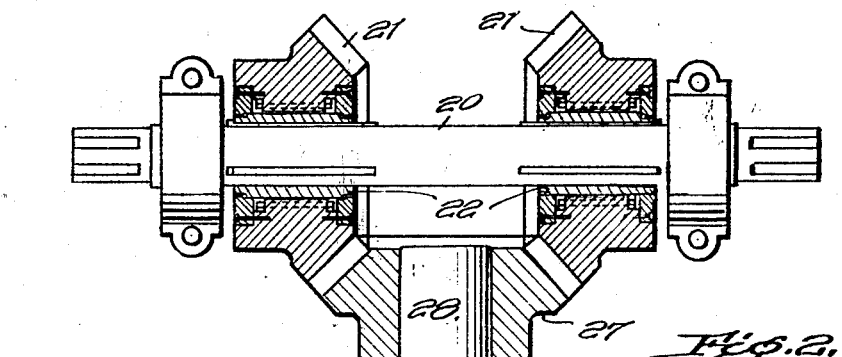
Fig.2.
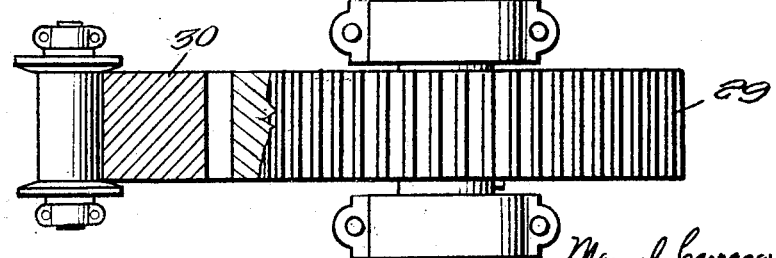
Inventor
Manuel Carrasco-Sanchez
By
Attorney Dec. 29, 1925.　　　　　　　　　　　　　　1,567,419
M. CARRASCO-SÁNCHEZ
MECHANICAL MOVEMENT
Filed April 3, 1925　　　3 Sheets-Sheet 2
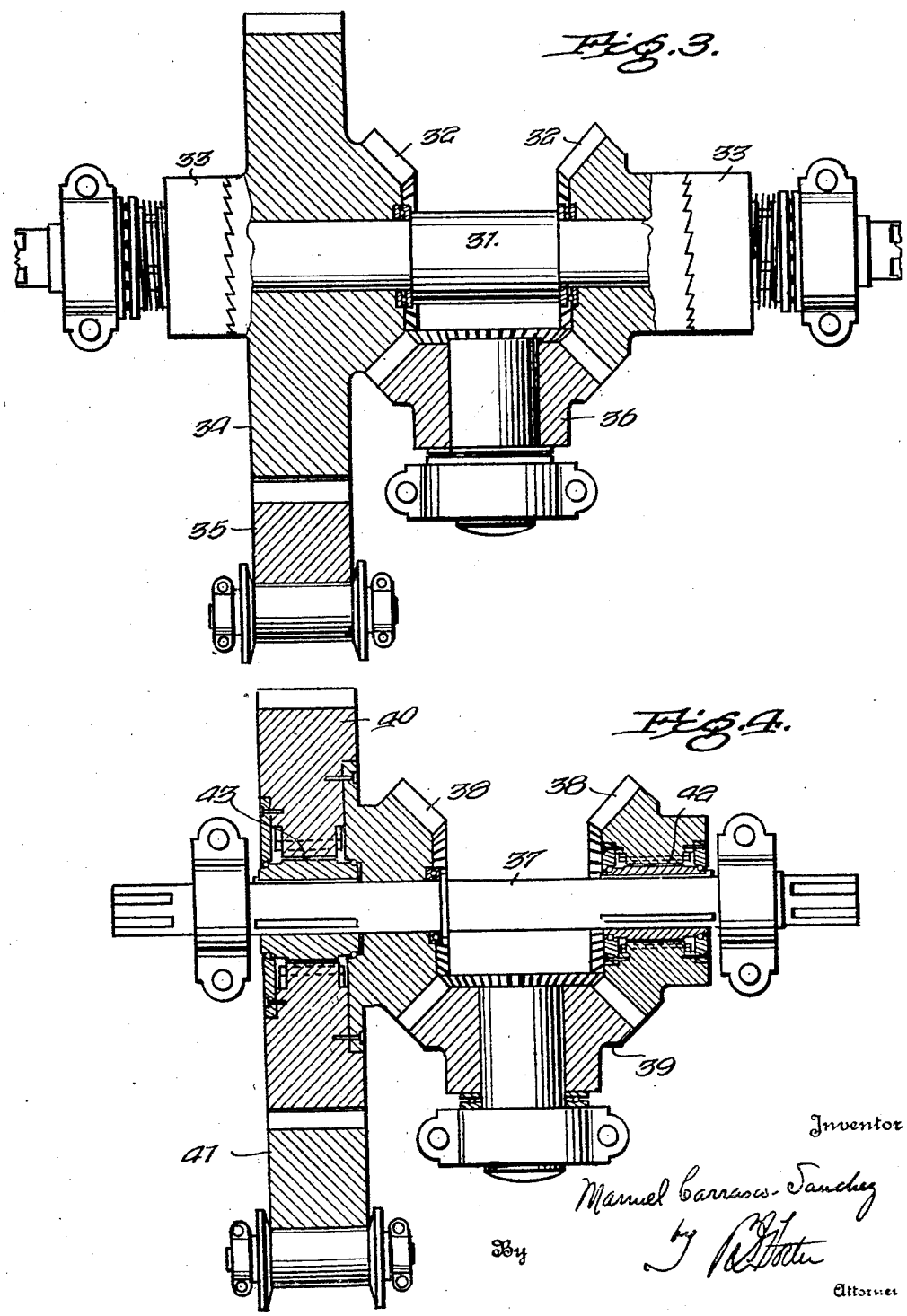

Dec. 29, 1925.                                                        1,567,419
                          M. CARRASCO-SÁNCHEZ
                          MECHANICAL MOVEMENT
                  Filed April 3, 1925      3 Sheets-Sheet 3
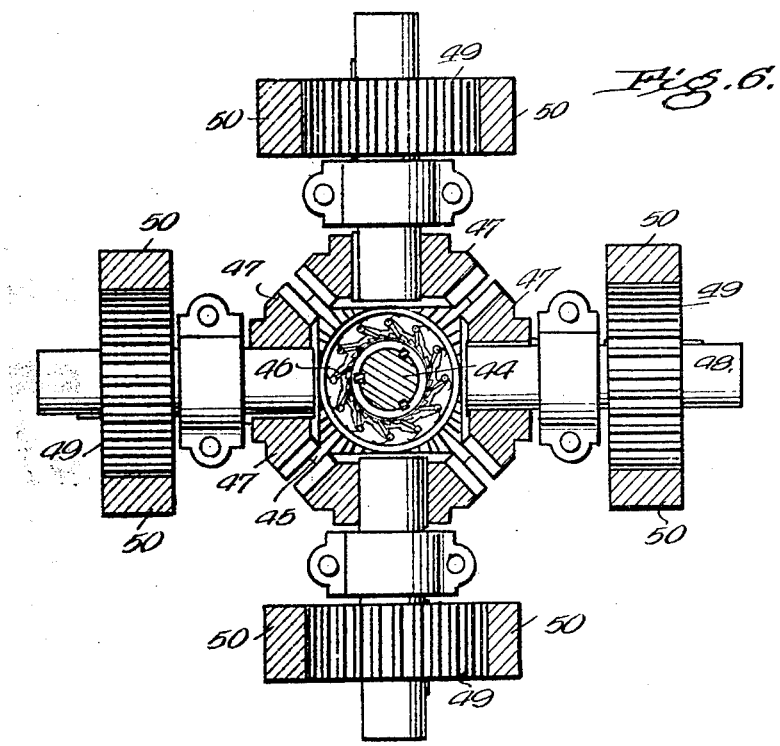
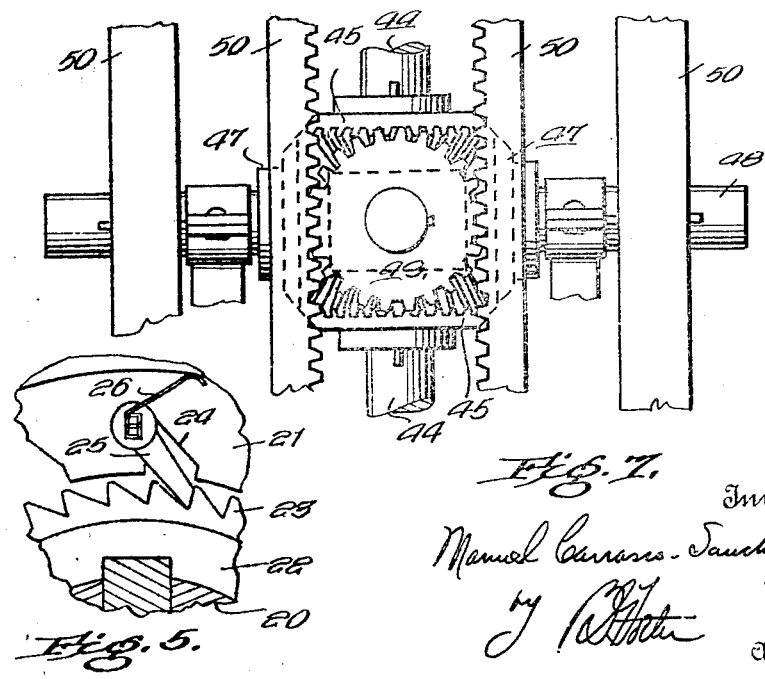

Patented Dec. 29, 1925.

1,567,419

UNITED STATES PATENT OFFICE.

MANUEL CARRASCO-SÁNCHEZ, OF WASHINGTON, DISTRICT OF COLUMBIA.

MECHANICAL MOVEMENT.

Application filed April 3, 1925. Serial No. 20,531.

*To all whom it may concern:*

Be it known that I, MANUEL CARRASCO-SÁNCHEZ, a subject of the King of Spain, residing at Washington, in the District of Columbia, have invented certain new and useful Improvements in Mechanical Movements, of which the following is a specification.

The present invention relates to mechanism for transforming reciprocatory into rotary motion.

The object is to provide an effective mechanism of this character, in which a number of prime movers may be utilized by operating on a single driven rotary member. It thus is useful in connection with a multiple cylinder engine for automobiles, aeroplanes and the like.

In the accompanying drawings:

Figure 1 is a view partially in elevation and partially in section of one embodiment of the invention, Figure 2 is a structure somewhat similar to Figure 1, but utilizing a different form of pawl and ratchet mechanism, Figure 3 is a view similar to Figure 1, but showing the driving rack operating on a different element of the combination, Figure 4 is a view of a structure similar to Figure 2, but showing the driving rack as disclosed in Figure 3.

Figure 5 is a detail view in elevation illustrating the form of pawl and ratchet means employed in Figures 2 and 4, Figure 6 is a view partly in elevation and partly in section showing a multiple drive, Figure 7 is a plan view of the structure shown in Figure 6.

Referring to the embodiment disclosed in Figure 1, a driven shaft 8 is employed, on which are loosely journaled bevel gears 9. The outer ends of these gears are provided with sets of reversely disposed ratchet teeth 10. Ratchet heads 11 are feathered on the driving shaft 8, outside the gears 9 and have teeth 12 that interlock with the teeth 10. These heads are yieldingly urged into such interlocking engagement by means of suitable coiled springs 13 which may be backed against roller bearings 14.

Interposed between the bevel gears 9 and intermeshing with both is an intermediate bevel gear 15 fixed to a shaft 16 that is located perpendicularly to the shaft 8, and said shaft 16 has mounted on its outer end a gear 17 that is of greater diameter than the gear 15. A reciprocatory driving rack 18, operated by any suitable means, is in mesh with the gear 17, being preferably supported on one or more rollers, as 19.

With this construction, when the rack 18 is reciprocated, it will be evident that the gears 17 and 15 will be turned back and forth, thereby transmitting corresponding rotations to the gears 9. When one of the gears 9 rotates in one direction, it will be obviously clutched to the driven shaft 8, through its head 11, and thus said shaft will be rotated in a predetermined direction. The other gear 9, rotating in the opposite direction, is free and ratchets past the head 11. When the reverse rotation of the gears takes place, the first gear 9, which has been clutched to the shaft, becomes free and ratchets past its head 11, while the other gear 9 will now be clutched to the shaft 8 through its head 11, and thus the rotation of the shaft 8 will be positively continued.

In the structure shown in Figure 2, the driving shaft is designated 20, and has the two bevel gears 21 journaled on sleeves 22 that are fixed to the shaft 20. These sleeves 22, as shown in Figure 5, are provided with peripheral rings of ratchet teeth 23. The gears 21 have sockets 24 therein, in which are pivotally mounted pawls 25 that operate either to interlock with the teeth 23 when the gear moves in one direction, or to ride over said teeth when moving in an opposite direction. Springs 26 serve to urge the pawls into engagement with the teeth. It will be obvious that the teeth 23 and pawls 25 of the two gears 21 are arranged in reverse relation.

The gears 21 are driven by a transversely disposed bevel gear 27 meshing with both and carried by a stub shaft 28. This stub shaft has a gear 29 of larger diameter than the gear 27, and said gear 29 is in mesh with a reciprocatory driving rack 30.

The operation of this structure is the same as that disclosed in Figure 1.

Instead of driving the mechanism directly through the stub shaft 16 or 28, the driving rack may be made to operate on a gear fixed to or forming a part of one of the bevel gears 9 or 21. For instance, as shown in Figure 3 the driven shaft is shown at 31, and the two bevel gears are illustrated at 32. In this form of structure, the gears 32 are adapted to be alternately clutched to the shaft 31 by heads 33 at the rear ends of the gears. One of the gears 32 has an integral enlargement formed into a gear 34 that is in mesh with a driving rack 35. The two gears 32 are connected by an intermediate bevel gear 36 in mesh with both.

The internal pawl and ratchet mechanism shown in Figures 2 and 5 may be employed in this type of structure, as shown in Figure 4. In this embodiment of the invention the driven shaft is illustrated at 37 and the two bevel gears are designated 38. These gears are connected by an intermediate gear 39, and fixed to one of the gears 38 is an enlarged gear 40 in mesh with a driving rack 41. The internal pawl mechanisms corresponding to the detail shown in Figure 5, are shown at 42 and 43, one being formed in one of the gears 38, the other being located in the gear 40.

In order that a number of power units may be utilized, mechanism such as is illustrated in Figures 6 and 7 may be employed. In this embodiment the driven shaft is designated 44, and journaled thereon are the bevel gears 45 having opposite ratchet connections with the driven shaft, one of said ratchet connections being shown at 46, and the other being a duplicate, but reversed as already explained. A plurality of intermediate bevel gears 47 mesh with the bevel gears 45 and are carried by stub shafts 48. On said stub shafts are located gears 49, and meshing with each of said gears 49, are two oppositely operated driving racks 50.

It will be evident that with this construction and considering that each rack may be operated by one or more power units, a compact driving mechanism is secured for the driven shaft 44.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In motion transformation mechanism, the combination with a shaft to be driven, of gears journaled on the shaft, ratchet mechanisms for clutching the respective gears to the shaft and operating respectively to clutch one gear to the shaft when said gear is rotated in one direction and clutching the other gear to the shaft when said first gear is rotated in the other direction, an intermediate gear interposed between and in mesh with said gears, a driving gear fixed to one of said gears, and a plurality of oppositely reciprocatory driving racks operating on said driving gear.

2. In motion transformation mechanism, the combination with a shaft to be driven, of gears journaled on the shaft, ratchet mechanisms for clutching the respective gears to the shaft and operating respectively to clutch one gear to the shaft when said gear is rotated in one direction and clutching the other gear to the shaft when said first gear is rotated in the other direction, a plurality of intermediate gears meshing with said gears and driving racks that operate the intermediate gears.

3. In motion transformation mechanism, the combination with a shaft to be driven, of gears journaled on the shaft, ratchet mechanism for clutching the respective gears to the shaft and operating respectively to clutch one gear to the shaft when said gear is rotated in one direction and clutching the other gear to the shaft when said first gear is rotated in the other direction, a plurality of intermediate gears meshing with said gears, a plurality of driving gears fixed to the intermediate gears, and a plurality of reciprocatory driving racks meshing with each of the driving gears.

In testimony whereof I affix my signature

MANUEL CARRASCO-SÁNCHEZ.